United States Patent
Aaseby et al.

(10) Patent No.: US 8,336,913 B1
(45) Date of Patent: Dec. 25, 2012

(54) STEERING DEVICE FOR PALLET JACK

(75) Inventors: Allen C. Aaseby, Thief River Falls, MN (US); Fred O. Hartmann, Thief River Falls, MN (US)

(73) Assignee: Grand Steer Inc., Thief River Falls, MN (US)

( * ) Notice: Subject to any disclaimer, the term of this patent is extended or adjusted under 35 U.S.C. 154(b) by 320 days.

(21) Appl. No.: 12/775,942

(22) Filed: May 7, 2010

Related U.S. Application Data

(60) Provisional application No. 61/176,185, filed on May 7, 2009.

(51) Int. Cl.
*B60B 11/10* (2006.01)

(52) U.S. Cl. ............ 280/767; 280/43.12; 280/641; 280/38

(58) Field of Classification Search .......... 280/43.12, 280/641, 38, 651, 767, 43.17, DIG. 1; 414/495, 414/530, 533, 705; 16/23, 29, 34
See application file for complete search history.

(56) References Cited

U.S. PATENT DOCUMENTS

| | | | |
|---|---|---|---|
| 575,390 A | 1/1897 | Burnett | |
| 2,178,647 A * | 11/1939 | Raymond et al. | 280/43.12 |
| 2,327,583 A | 8/1943 | Framhein | |
| 2,361,544 A * | 10/1944 | Hastings, Jr. | 280/46 |
| 2,417,394 A | 3/1947 | Framhein | |
| 2,422,538 A | 6/1947 | Framhein | |
| 2,550,548 A | 4/1951 | Framhein | |
| 2,598,151 A | 5/1952 | Warshaw | |
| 2,623,756 A | 12/1952 | Elliott et al. | |
| 2,727,752 A | 12/1955 | Gold | |
| 2,734,752 A | 2/1956 | Boylan et al. | |
| 3,260,534 A | 7/1966 | Knights | |
| 3,372,769 A | 3/1968 | Jung et al. | |
| 3,421,775 A | 1/1969 | Dugelay | |
| 4,027,771 A * | 6/1977 | Adams | 414/495 |
| 4,589,669 A | 5/1986 | Kedem | |
| 4,863,179 A * | 9/1989 | Isaacs | 280/33.996 |
| 5,354,080 A | 10/1994 | Jones | |
| 5,403,024 A * | 4/1995 | Frketic | 280/43.12 |
| 5,516,128 A | 5/1996 | Nakade et al. | |
| 5,951,234 A * | 9/1999 | Johansson | 414/495 |
| 6,260,646 B1 * | 7/2001 | Fernandez et al. | 180/65.6 |
| 6,343,907 B1 | 2/2002 | Schalmath | |
| 6,616,395 B2 * | 9/2003 | Fransson | 414/495 |
| 6,742,790 B2 | 6/2004 | Seagraves et al. | |
| 6,808,357 B2 * | 10/2004 | Lee | 414/495 |
| 7,226,060 B2 * | 6/2007 | Hartmann et al. | 280/43.12 |
| 7,427,075 B2 * | 9/2008 | Hartmann et al. | 280/43.12 |

(Continued)

*Primary Examiner* — John Walters
*Assistant Examiner* — James Triggs
(74) *Attorney, Agent, or Firm* — DuFault Law Firm, P.C.; Dustin R. DuFault

(57) ABSTRACT

A steering device for decreasing a turning radius of a pallet jack is disclosed. The steering device comprises a first portion fixedly connected to the pallet jack between a main wheel and the extensible roller thereof. A second portion pivotally attaches to the first portion. A spring disposed within the first portion urges the second portion to remain in a selected position. A wheel disposes within the second portion. Positioning the pallet jack towards the lowered position, the wheel engages the ground causing the extensible roller to disengage the ground whereupon the main wheel and the wheel define a second turning radius which is lesser than the first turning radius. Upon the wheel contacting a lower cross member of a pallet, the second portion is urged against the biasing force of the spring to pivot relatively upwards and over the lower cross member.

4 Claims, 4 Drawing Sheets

U.S. PATENT DOCUMENTS

| | | | |
|---|---|---|---|
| 7,475,887 B2 * | 1/2009 | Hartmann et al. | 280/43.12 |
| 7,641,011 B2 * | 1/2010 | Fridlington et al. | 180/68.5 |
| 2002/0034431 A1 * | 3/2002 | Fransson | 414/495 |
| 2004/0013505 A1 * | 1/2004 | Lee | 414/495 |
| 2005/0002766 A1 * | 1/2005 | Hartmann et al. | 414/467 |
| 2006/0125196 A1 * | 6/2006 | Hartmann et al. | 280/43.12 |
| 2007/0284838 A1 * | 12/2007 | Hartmann et al. | 280/47.34 |
| 2008/0042381 A1 * | 2/2008 | Hartmann et al. | 280/43.12 |

* cited by examiner

STEERING DEVICE FOR PALLET JACK

CROSS-REFERENCE TO RELATED APPLICATION(S)

This application claims the benefit of U.S. Provisional Patent Application No. 61/176,185 entitled STEERING DEVICE FOR PALLET TRUCK, filed on 7 May 2009, which is hereby incorporated herein by reference.

BACKGROUND OF INVENTION

The present invention generally relates to pallet jacks. In particular, the present invention relates to a device for decreasing a turning radius of a pallet jack.

In the art of material handling, pallets jacks (or pallet trucks) typically include wheeled devices intended for the manual lifting of a pallet, with a load resting thereon, to transport the pallet and load from one work area to another. U.S. Pat. No. 4,589,669 discloses an exemplary pallet jack, or hydraulic pallet truck. Pallet jacks typically include forked support arms upon which extensible rollers are mounted at terminal ends. The opposing ends of the forked support arms are typically connected to one another and attached in some fashion to a pivotal wheel with a hydraulic lift. The pivotal wheel allows the user to steer the pallet jack when either pushing or pulling the pallet jack. The hydraulic lift is operatively connected the wheel and the extensible rollers to raise and lower the support arms to engage and transport the pallet or to disengage the pallet jack from the pallet.

Due to the relatively heavy loads pallet jacks are intended to transport, and the size of the pallets themselves, the length of the forked arms are designed to provide the greatest support and stability when in contact with the pallets. Therefore, to maximize stability, the roller of each fork is terminally positioned on each fork to maximize the distance each roller is from the main wheel. However, by positioning the rollers at such a distance from the main wheel, the pallet jack is sometimes difficult to steer in tight or crowded work areas due to the fact that the turning radius of the pallet jack is defined by the distance between the main wheel and the rollers. The turning radius of the pallet jack becomes especially problematic when the work area does not provide for adequate space, as is the case with crowded warehouses or storerooms. Also, because the steerable wheel is positioned at one end and the rollers are positioned at the opposite end, the center of curvature of the pallet jack is virtually positioned between the rollers at the terminal ends of the forked arms. Therefore, positioning the forked arms to engage the pallet is made difficult because very little lateral movement occurs at the terminal ends of the forked arms relative to lateral movement made at the opposing end having the main steering wheel.

U.S. Pat. Nos. 7,226,060 and 7,427,075 teach the use of a device for decreasing the turn radius of an empty pallet jack. It has been discovered, though, that such devices have a tendency to impede the ability of inserting the support arms of a pallet jack within certain pallets for the lifting and moving thereof. As most pallets commonly include a lower cross-beam over which the support arms of the pallet jack must travel to position the pallet jack to lift the pallet, the rigid devices as taught in the aforementioned patents are sometimes difficult to pass over said cross-beams.

BRIEF SUMMARY OF INVENTION

The present invention includes a device attachable to a pallet jack for facilitating steering and positioning of the pallet jack while in a lowered position. The device includes a first member fixable to an underside of a support leg of the pallet jack. A second member containing a roller or wheel for contacting the ground pivotally attaches to the first member. A spring disposed within the first member provides bias against the second member to maintain the second member at a first position relative to the second member. The second housing member further includes a forward skid plate for contacting and slidably disposing upon a lower cross-beam of a pallet structure.

The pallet jack is positionable between a raised position and a lowered position by means of a hydraulic mechanism. The hydraulic mechanism connects to a main wheel and extensible rollers terminally positioned on each support leg. While in the raised position, the extensible rollers and the main wheel contact the ground, defining a first turning radius of the pallet jack. Upon lowering the pallet jack, the roller of each steering device engages the ground while the extensible rollers disengage the ground. Because the steering device is positioned between the main wheel and the terminally positioned extensible rollers, the resulting turning radius of the pallet jack is decreased thus allowing for better control and positioning of the pallet jack.

When positioning the pallet jack to engage a pallet, the extensible wheels are positioned slightly off the ground and each leg is inserted within the pallet structure between a bottom base board and upper supporting board. Upon positioning each leg further within the pallet structure, the forward skid plate of each steering device engages the bottom base board of the pallet structure. Upon applying appropriate force and further positioning the pallet jack within the pallet structure, the biasing force of the spring against the second member is overcome and the second member is urged upward relative to the ground to permit the second member and wheel to travel over the bottom base board. Upon traveling past the bottom base board, the second member is urged by the bias force of the spring back to its home position and the pallet jack is fully positionable within the pallet structure.

DETAILED DESCRIPTION

Figure 1:
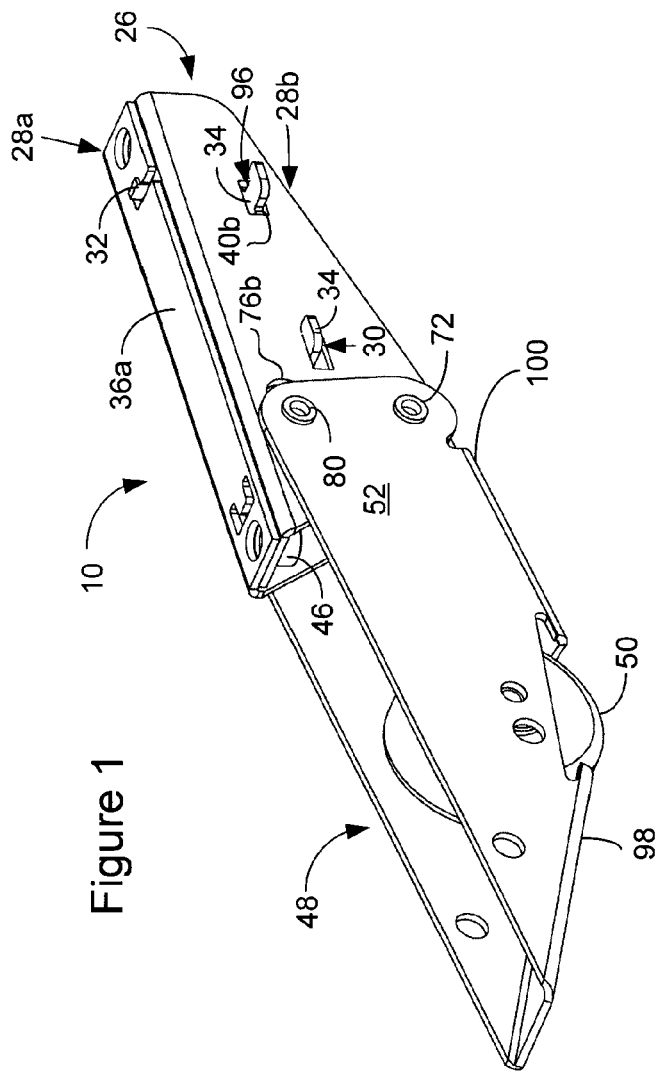
FIG. 1 is a perspective view of a steering device of the present invention.
Figure 2:
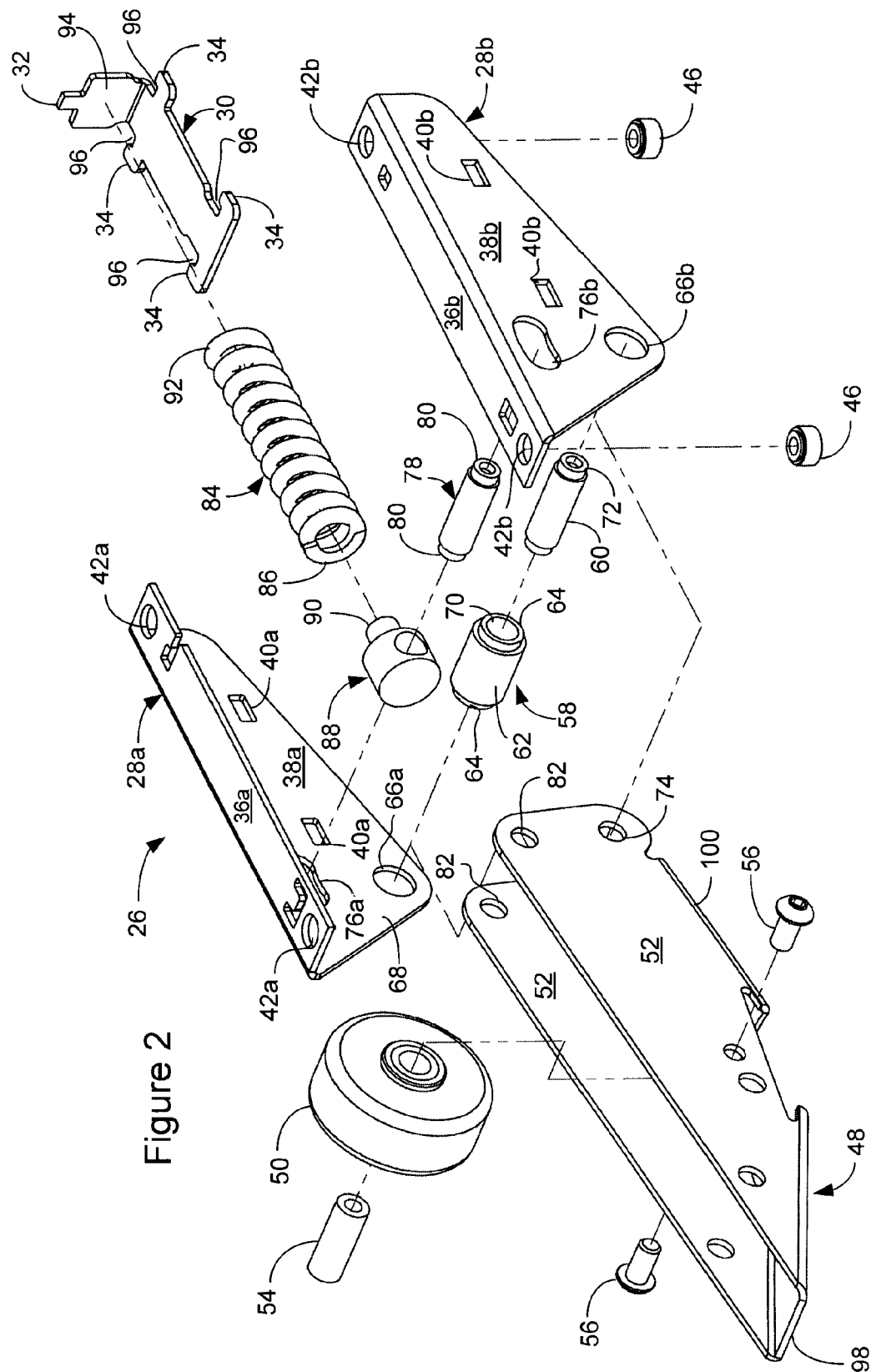
FIG. 2 is a perspective exploded view of a steering device of the present invention.
Figure 3:
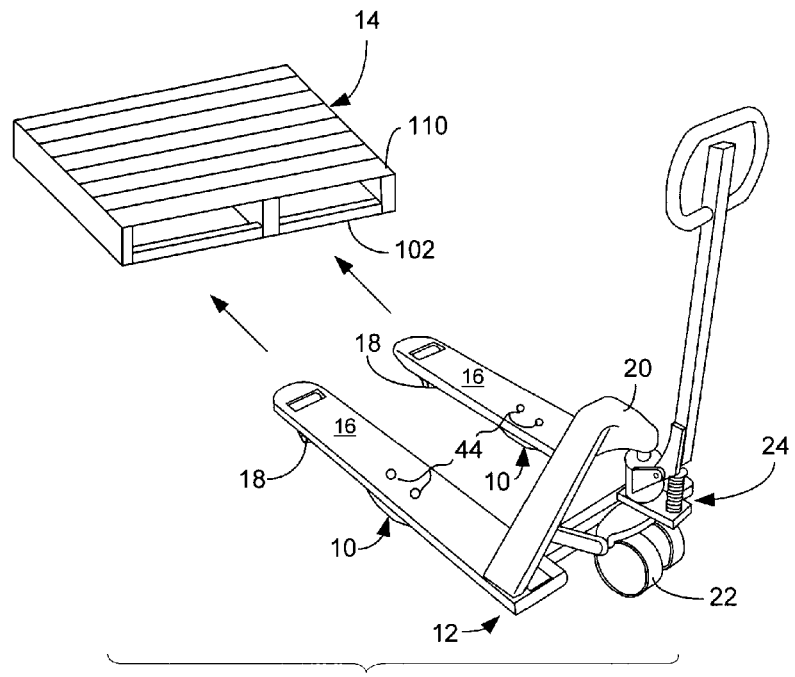
FIG. 3 is a perspective view of a pallet jack utilizing the steering device of the present invention before engaging a pallet.

A steering device of the present invention is generally indicated at 10 in FIGS. 1 and 2. The steering device 10 is preferably used in conjunction with material handling equipment, for example, a pallet jack 12 as illustrated in FIG. 3. The pallet jack 12, or hydraulic pallet truck, is a material handling device known to those skilled in the art of material handling for moving pallets 14 within a work area, such as a warehouse, storage room or within a manufacturing facility. For purposes of the present description, an exemplary pallet jack 12 includes leg members 16 having extensible rollers 18 attached to an A-frame 20 having a positionable main wheel 22. A hydraulic lifting mechanism 24 for raising and lowering the pallet jack 12 connects to the main wheel 22 and the extensible rollers 18. In the lowered position, the pallet jack 12 can be positioned such that the leg members 16 are disposable within the pallet 14 resting on the ground. Actuating the hydraulic lifting mechanism 24 positions the pallet jack 12 toward the raised position resulting in the leg members 16 engaging the pallet 14 and lifting the pallet 14 from the ground, whereby the pallet 14 can be transported to the desired portion of the work area.

Referring back to FIGS. 1 and 2, the steering device 10 of the present invention includes a base member 26 attachable to an underside of a leg member 16. The base member 26 generally includes a first half 28a and a corresponding second half 28b locked together by a key 30. The key 30 is generally "L"-shaped and includes a vertical locking tab 32 and horizontal locking tabs 34 extending therefrom. Each half 28a, 28b is constructed to include a top portion 36a and 36b, respectively, with a downwardly extending wall 38a and 38b, respectively. Rectangular apertures 40a and 40b, respectively, are positioned through each wall 38a, 38b to receive the horizontal locking tabs 34 extending from the key 30 while apertures 42a and 42b, respectively, are positioned on the top portion 36a, 36b of each half 28a, 28b to receive the vertical tab 32. Apertures 43a and 43b, respectively, are positioned within the top portions 36a, 36b of each half 28a, 28b to permit corresponding bolts 44 to be fitted through apertures 45 machined in the leg member and threadably engage burrs 46.

The steering device 10 of the present invention further includes a positionable member 48 pivotally connected to the base member 26. The positionable member 48 contains a wheel or roller 50 for engagement with the ground when the pallet jack 12 is in a lowered position and not carrying a load. The wheel 50 rotatably attaches to and disposes between opposing side walls 52 by means of an axial member 54 and corresponding screws 56. It should be noted, however, that other attaching means known to those skilled in the art is well within the scope of the present invention.

The second positional member 48 pivotally attaches to the first base member 26 by means of a machined spacer 58 and an axial member 60. As best shown in FIG. 2, the machined spacer 58 includes a central portion 62 having a first diameter, as well as terminal portions 64 of lesser diameter. Each wall 38a, 38b of the base member 26 contains opposing apertures 66a and 66b, respectively, to receive the terminal portions 64 of the spacer 58, and the central portion 62 of the spacer 58 abuts against opposing inner surfaces 68 of the base member walls 38a, 38b thereby providing support to the walls and preventing any inward biasing. A through-bore 70 contained within the spacer 58 receives the axial member 60. Each wall 52 of the positionable member 48 in turn contains an aperture 74 for accepting the respective terminal ends 72 of the axial member 60, thereby securing the positional member 48 to the base member 26. This arrangement permits the pivotal movement of the positionable member 48 about the base member 26 without the walls 38a, 38b of the base member 26 engaging with the walls 52 of the positionable member 48, and vice versa. However, to limit the amount of travel the positionable member 48 is permitted about the base member 26, each wall 38a, 38b of the base member 26 contains slotted apertures 76a and 76b, respectively, for receiving a guide post 78 extending between each wall 36a, 36b of the base member. Terminal ends 80 of the guidepost 78 seat within opposing apertures 82 of the positionable member 48. The guidepost 78 slidably engages each slotted aperture 76a, 76b which defines end limits of the positioning of the positionable member 48.

To retain the positionable member 48 at one of the end limits, or home position, a spring 84 is provided to exert a biasing force against the positionable member 48. As shown in FIG. 2, a proximal end 86 of the spring 84 connects to the base member 26 and the positionable member 48 by means of a cap member 88 disposed on the guide post 78. A nub 90 extending from the cap 88 disposes partially within the proximal end 86 of the spring 84. An opposing distal end 92 of the spring 84 abuts against a lower leg 94 of the key 30. When positioned against the lower leg 94 and the cap member 88, the spring 84 is compressed and provides a biasing force against the positionable member 48. This biasing force urges the guidepost 78 to engage each slotted aperture 76a, 76b at the end limit, or home position.

The compressive force of the spring 84 also assists in locking the halves 28a, 28b together by means of the key 30. As described, the key 30 contains both vertical 32 and horizontal tabs 34. When assembling the base member 26, the two halves 28a, 28b are brought together, along with the spring 84, cap member 88, key 30, spacer 58 and axial member 60. The key 30, the lower leg 94 of which is abutted against the spring 84, is then positioned to align the vertical tab 32 with its respective apertures 42a, 42b and the horizontal tabs 34 with their respective slots 40a, 40b. In so positioning the key 30, the spring 84 is compressed. Upon further positioning the key 30 to compress the spring 84, the horizontal tabs 34 travel to align with their respective slots 40a, 40b. When proper alignment of the key 30 occurs, the two halves 28a, 28b are positioned further inward to dispose the horizontal tabs 34 of the key 30 within their respective slots 40a, 40b. The key 30 is then released which causes the biasing force of the spring 84 to urge the walls 38a, 38b between hooked portions 96 of the horizontal tabs 34, thereby locking the two halves 28a, 28b together.

The second positionable member 48 further includes a forward skid plate 98 and rearward skid plate 100. Each skid plate 98, 100 extends between each side wall 52. Each skid plate 98, 100 is constructed in such a fashion to be at an angle relative to the horizontal when the device 10 is attached to a leg 16 of the pallet jack 12. The wheel 50 is positioned between each skid plate 98, 100 and extends past walls 52 of the positionable member so that engagement with the ground is possible without the walls 52 or either skid plate 98, 100 contacting the ground. The skid plates 98, 100 are designed to engage a lower board member 102 of the pallet 14 upon positioning the pallet jack 12 to engage or disengage the pallet 14, as will be discussed in further detail.

Figure 5:
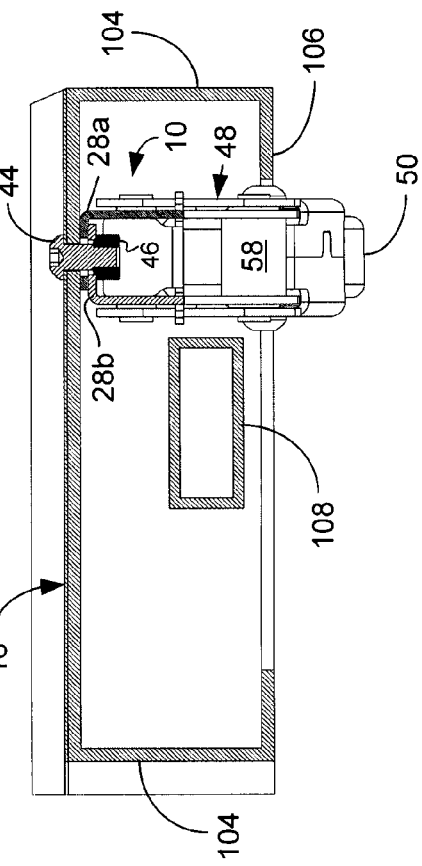
FIG. 5 is a cross-sectional view of a support member containing the steering device of the present invention.
Figure 4:
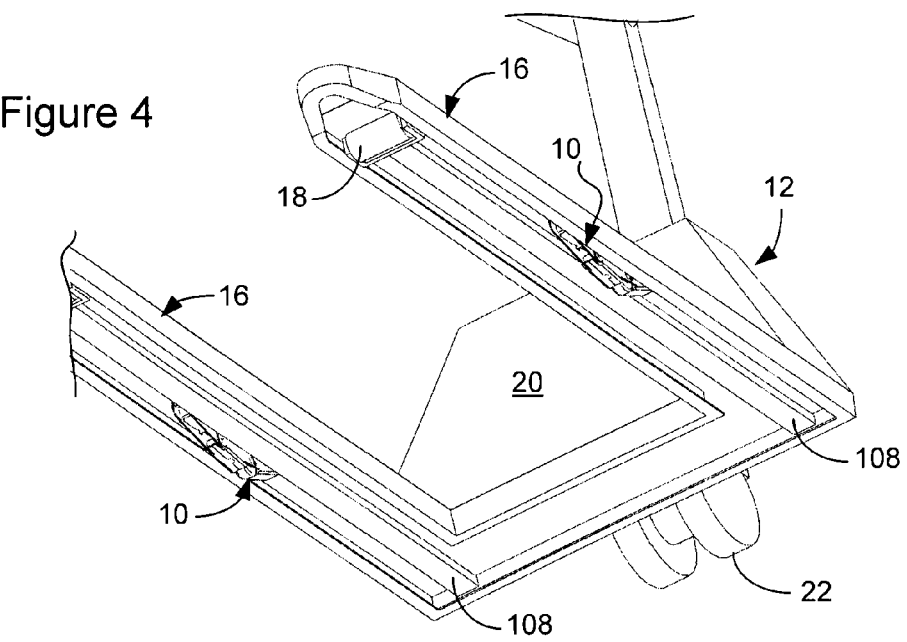
FIG. 4 is a perspective view of an underside of a pallet jack with the steering device of the present invention.

The steering device 10 of the present invention is designed to affix to an underside of each fork member 16, as illustrated in FIGS. 4 and 5. It is preferable that a single steering device 10 be attached to each fork member 16, but not absolutely necessary to practice the present invention. When attaching the steering device 10 onto each fork member 16, it is preferable to position each steering device 10 directly opposite one another. It is also preferable to position each steering device 10 approximately half the distance between the extensible roller 18 of each arm and the main wheel 22, however, each steering device 10 can be positioned opposite one another at any desirable point along the underside of the respective fork member 16.

As illustrated in FIG. 5, each fork member 16 is typically formed to include downwardly extending side members 104 to provide overall rigid support to the fork member 16. The downwardly extending side members 104 include flange portions 106 extending therefrom. Disposed along a center underportion of each fork member 16 is a connecting member 108 which operatively connects the hydraulic lifting mechanism 24 with the respective extensible roller 18. As described, each device is preferably bolted to the underside of each leg, but other means of attachment are well within the scope of the present invention, including welding or riveting.

Figure 6:
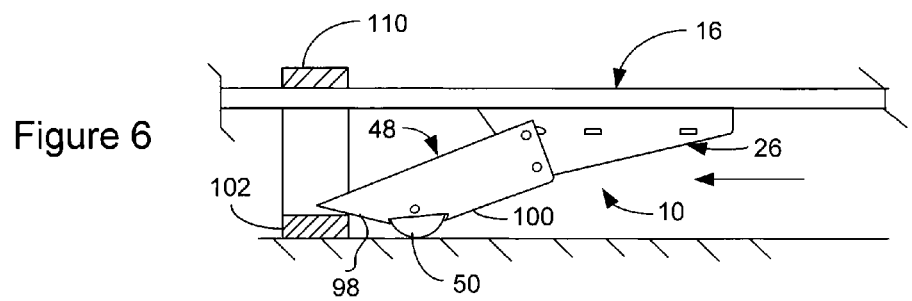
FIG. 6 is a side profile view of a support member of a pallet jack containing a device of the present invention attached thereto upon being inserted into a pallet.
Figure 7:
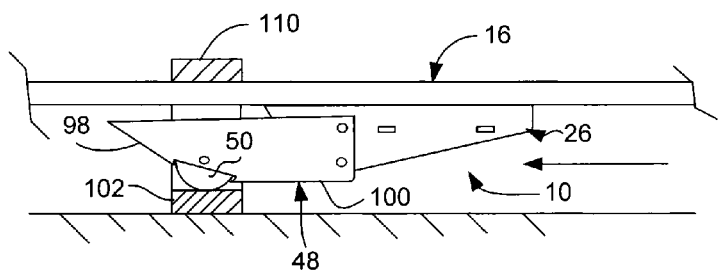
FIG. 7 is a side profile view of a support member of a pallet jack containing a device of the present invention being urged upward and over a lower board of a pallet.

As illustrated in FIG. 3, when engaging the pallet 14, the pallet jack 12 is positioned such that the pallet 14 is capable of receiving each leg 16 of the pallet jack 12. As illustrated in FIG. 6, upon inserting each leg 16 within the pallet 14 structure, the forward skid plate 98 engages the lower board member 102 of the pallet 14. Further positioning of each leg 16 into the pallet 14 causes the skid plate 98 to urge the positionable member 48 relatively upwards against the biasing force of the spring 84. Thus, in instances where the gap between the bottom board 102 and upper board 110 of the pallet 14 into which each leg 16 is being inserted is less than the height of each leg 16 with the wheel 50 of the device 10 engaging the ground, the positionable member 48 is permitted to be urged upward and over the lower board member 102, as is illustrated in FIG. 7. Also, upon removing the pallet jack 12 from the pallet 14, the rear skid plate 100 performs the same function when engaging the lower board member 102, thereby allowing the positionable member 48 to be urged up and over the board member 102 against the biasing force of the spring 84. Upon removal of the pallet jack 12 from the pallet 14, the biasing force of the spring 84 urges the positionable member 48 back to the home position. The biasing force provided by the spring 84 is such that the positionable member 48 will remain at the home position when the pallet jack 12 is lowered and the wheel 50 is engaged with the ground.

Figure 8:
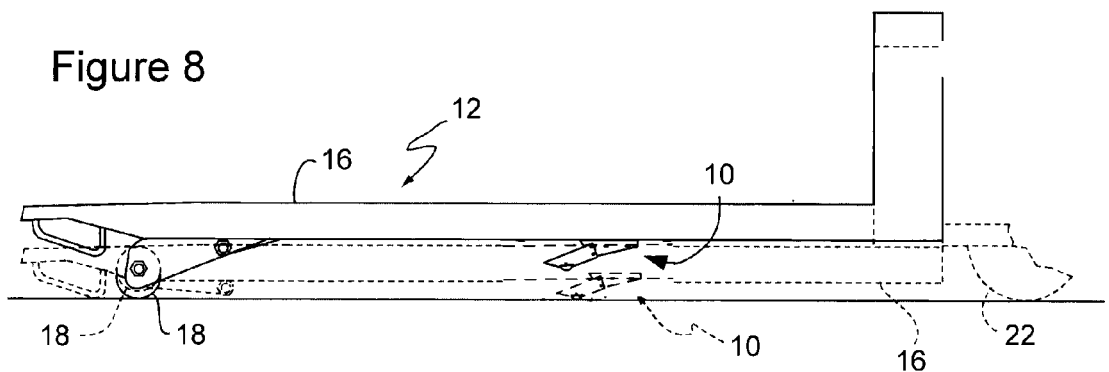
FIG. 8 is a side-view of a pallet jack in a raised position and a lowered position (dashed lines).

In operation, and as exemplified in FIG. 8, the pallet jack 12 is positionable between a raised position and a lowered position (dashed lines). As is known in the art, while in the raised position, the extensible roller 18 of each leg 16 and the main wheel 22 contact the ground and the steering device 10 is disengaged from the ground. This permits the pallet jack 12 to be used in a conventional manner when transporting pallets 14. As such, the turning radius of the pallet jack 12 while in the raised position is defined by the distance between the main wheel 22 and the extensible rollers 18. However, upon lowering the pallet jack 12, the wheels 50 from each steering device 10 contact the ground, and further actuation from the lifting mechanism 24 causes the respective extensible roller 18 to be drawn up even further and eventually disengage from the ground. At this point, only the rollers 50 of the respective steering device 10 and the main wheel 22 contact the ground. Thus, upon lowering the pallet jack 12 a new turning radius is defined by the distance between the positioning of the steering devices 10 and the main wheel 22. Because the steering devices 10 are positioned closer to the main wheel 22 than the extensible rollers 18, the turning radius of the pallet jack 12 is decreased. The decreased turning radius permits the pallet jack to be more maneuverable, especially in tight or congested spaces.

When the pallet jack 12 is in the lowered position, the steering device 10 is in contact with the ground and the rollers 50 permit the pallet jack 12 to be pushed or pulled in much the same manner as when the extensible rollers 18 are in contact with the ground. Each device 50, by way of the spring 84, also provides shock absorbing qualities which make the positioning of the pallet jack 12 much smoother. When in the lowered position, the pallet jack 12 is also maneuverable to pivot about the steering devices 10 with relation to the main wheel 22. This facilitates in positioning of the pallet jack 12 to align the legs 16 with pallet 14. Also, when the steering devices 10 are positioned on each leg member 16 in the preferred position, the turning radius of the pallet jack 12 is approximately halved in comparison to the turning radius of the pallet jack 12 when it is in the raised position. In that respect, the steering device 10 of the present invention acts in much the same manner as described in commonly owned U.S. Pat. Nos. 7,226,060, 7,427,075 and 7,475,887, each of which are hereby incorporated herein by reference.

Although the present invention has been described with reference to preferred embodiments, workers skilled in the art will recognize that changes may be made in form and detail without departing from the spirit and scope of the invention.

The invention claimed is:

1. A steering device for decreasing a turning radius of a pallet jack, the pallet jack including a main wheel and an extensible wheel connected to a load supporting member, a first turning radius defined by the distance between the main wheel and the extensible wheel, the load supporting member positionable between a raised position and a lowered position, the steering device comprising:
   a first portion fixedly connected to the support member between the main wheel and the extensible wheel, the first portion including:
     surfaces defining first and second opposing apertures; and
     surfaces defining first and second slotted apertures;
   a second portion pivotally attached to the first portion, the second portion including:
     surfaces defining first and second opposing apertures, the apertures of the first portion cooperably alignable with the apertures of the second portion; and
     surfaces defining third and fourth opposing apertures cooperably alignable with the first and second slotted apertures of the first portion;
   a first axial member positionable through the apertures of the first portion and the apertures of the second portion to pivotally attach the second portion to the first portion;
   a second axial member positionable through the third and fourth apertures of the second portion and slideably engageable with the slotted apertures of the first portion;
   a spring disposed within the first portion, the spring biased against the second portion to urge the second portion to remain in a selected position; and
   a ground engageable roller at least partially disposed within the second portion, wherein positioning the support member towards the lowered position the ground engageable roller engages the ground causing the extensible wheel to disengage the ground whereupon the main wheel and the ground engageable roller define a second turning radius which is less than the first turning radius, whereupon the ground engageable roller contacting a lower cross member of a pallet, the second portion is urged against the biasing force of the spring to pivot toward the support member, wherein the amount of pivotal movement of the second portion relative to the first portion is defined by the length of the first and second slotted apertures.

2. The device of claim 1 and further comprising a spacer positionable within the first portion and the second portion, the spacer including a through-bore for receiving the axial member, the spacer having a center portion of a first diameter greater than the diameter of the first and second apertures of the first portion, the center portion engageable with opposing inner walls of the first portion.

3. The device of claim 1 wherein the first portion further comprises surfaces defining a third aperture, the device further comprising:
   a spring retaining member pivotally disposable upon the second axial member, the spring retaining member including a nub extending therefrom, the nub disposable within a first end of the spring; and an encasement member comprising:
   an abutment plate for engaging the second end of the spring; and
   a first outwardly extending tab disposable through the third aperture in the first member.

4. The device of claim 1 wherein the first portion at least partially disposes within the second portion.

* * * * *